(12) United States Patent
Walker

(10) Patent No.: US 6,702,581 B1
(45) Date of Patent: Mar. 9, 2004

(54) VOCABULARY TEACHING SYSTEM

(76) Inventor: Winona P. Walker, 4901 Lori St., Valdosta, GA (US) 31605

( * ) Notice: Subject to any disclaimer, the term of this patent is extended or adjusted under 35 U.S.C. 154(b) by 0 days.

(21) Appl. No.: 10/358,722

(22) Filed: Feb. 5, 2003

(51) Int. Cl.[7] .............................. G09B 19/00; A63F 3/06
(52) U.S. Cl. ....................... 434/167; 434/156; 273/269; 273/292; 273/296
(58) Field of Search ................................ 273/292, 296, 273/269; 434/156, 167, 170

(56) References Cited

U.S. PATENT DOCUMENTS

| | | | | |
|---|---|---|---|---|
| 422,682 A | * | 3/1890 | Young | 273/296 |
| 1,539,397 A | * | 5/1925 | Matravers | 434/349 |
| 1,542,392 A | * | 6/1925 | Johnson | 273/292 |
| 1,673,166 A | * | 6/1928 | Studebaker | 283/46 |
| 1,755,853 A | * | 4/1930 | Waring | 434/167 |
| 2,287,943 A | * | 6/1942 | O'Sullivan | 434/167 |
| D171,084 S | | 12/1953 | Corbett et al. | |
| 2,728,997 A | * | 1/1956 | Gross | 434/167 |
| 2,756,515 A | * | 7/1956 | Hoffman | 434/159 |
| 3,602,513 A | | 8/1971 | Breen | |
| 3,678,602 A | | 7/1972 | Alam | |
| 3,823,492 A | * | 7/1974 | Allain | 434/170 |
| 3,885,326 A | * | 5/1975 | Robinson et al. | 434/170 |
| 3,935,651 A | | 2/1976 | Mankoff et al. | |
| 4,021,937 A | * | 5/1977 | Kravitz | 434/167 |
| 5,310,347 A | | 5/1994 | Brand | |
| 5,366,377 A | * | 11/1994 | Miller | 434/178 |
| 5,458,338 A | | 10/1995 | Beardsley | |
| 6,450,499 B1 | * | 9/2002 | Letang | 273/272 |
| 6,491,524 B2 | * | 12/2002 | Bender | 434/159 |

* cited by examiner

Primary Examiner—Derris H. Banks
Assistant Examiner—Dmitry Suhol

(57) ABSTRACT

A vocabulary teaching system for helping a student to learn vocabulary words. The vocabulary teaching system includes a plurality of subsets each being designed for being used to help teach successive levels of vocabulary to the student. Each of the subsets comprises a plurality of vocabulary sheets and a plurality of worksheets. Each of the vocabulary sheets comprises a plurality of vocabulary indicia. Each of the vocabulary indicia of each of the vocabulary sheets is designed for representing a unique vocabulary word. Each of the worksheets comprises a plurality of sentence indicia. Each of the sentence indicia is designed for representing a sentence with one of the vocabulary indicia from one of the vocabulary sheets missing from the sentence whereby the associated one of the vocabulary indicia is related to one of the sentence indicia to facilitate teaching the usage of the associated one of the vocabulary indicia.

6 Claims, 3 Drawing Sheets

VOCABULARY TEACHING SYSTEM

BACKGROUND OF THE INVENTION

1. Field of the Invention

The present invention relates to vocabulary games and more particularly pertains to a new vocabulary teaching system for helping a student to learn vocabulary words.

2. Description of the Prior Art

The use of vocabulary games is known in the prior art. U.S. Pat. No. 5,458,338 describes a system for teaching grammar to a user through a game played similar to BINGO. Another type of vocabulary game is U.S. Pat. No. 3,935,651 having a plurality of playing cards each having vocabulary words one them to help a user to learn vocabulary words. U.S. Pat. No. 5,310,347 has a card game to facilitate learning to spell words on the cards. U.S. Pat. No. 3,678,602 has a card game for building the vocabulary of the players playing the game. U.S. Pat. No. Des. 171,084 shows a set of educational cards.

While these devices fulfill their respective, particular objectives and requirements, the need remains for a system that has certain improved features to help teach the usage of the vocabulary words.

SUMMARY OF THE INVENTION

The present invention meets the needs presented above by providing worksheets with sentence indicia using each of the vocabulary indicia from the vocabulary sheets so that the student has to identify which of the vocabulary indicia is to be used in each of the sentence indicia.

Still yet another object of the present invention is to provide a new vocabulary teaching system that provide a fun and entertaining way to learn vocabulary words.

To this end, the present invention generally comprises a plurality of subsets each being designed for being used to help teach successive levels of vocabulary to the student. Each of the subsets comprises a plurality of vocabulary sheets and a plurality of worksheets. Each of the vocabulary sheets comprises a plurality of vocabulary indicia. Each of the vocabulary indicia of each of the vocabulary sheets is designed for representing a unique vocabulary word. Each of the worksheets comprises a plurality of sentence indicia. Each of the sentence indicia is designed for representing a sentence with one of the vocabulary indicia from one of the vocabulary sheets missing from the sentence whereby the associated one of the vocabulary indicia is related to one of the sentence indicia to facilitate teaching the usage of the associated one of the vocabulary indicia.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
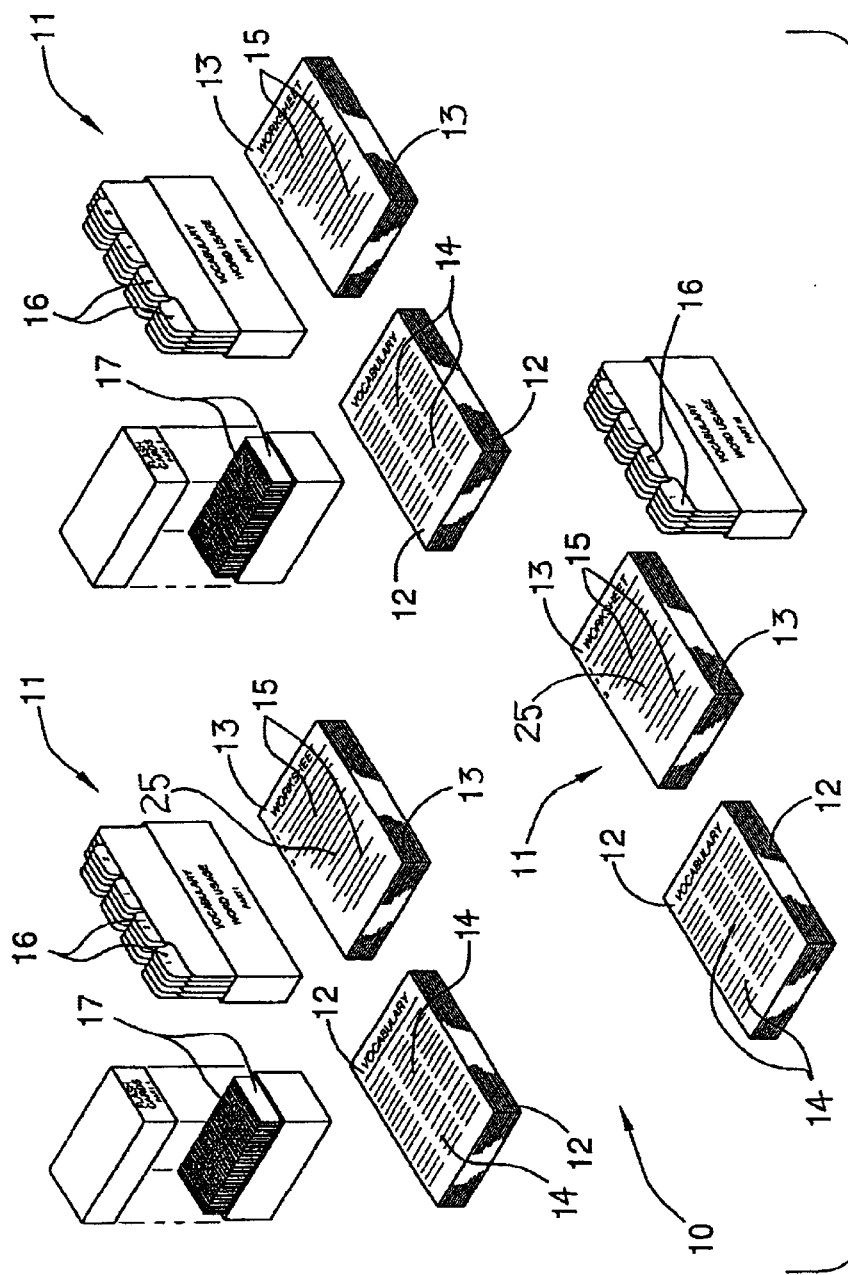
FIG. 1 is a perspective view of a new vocabulary teaching system according to the present invention.
Figure 2:
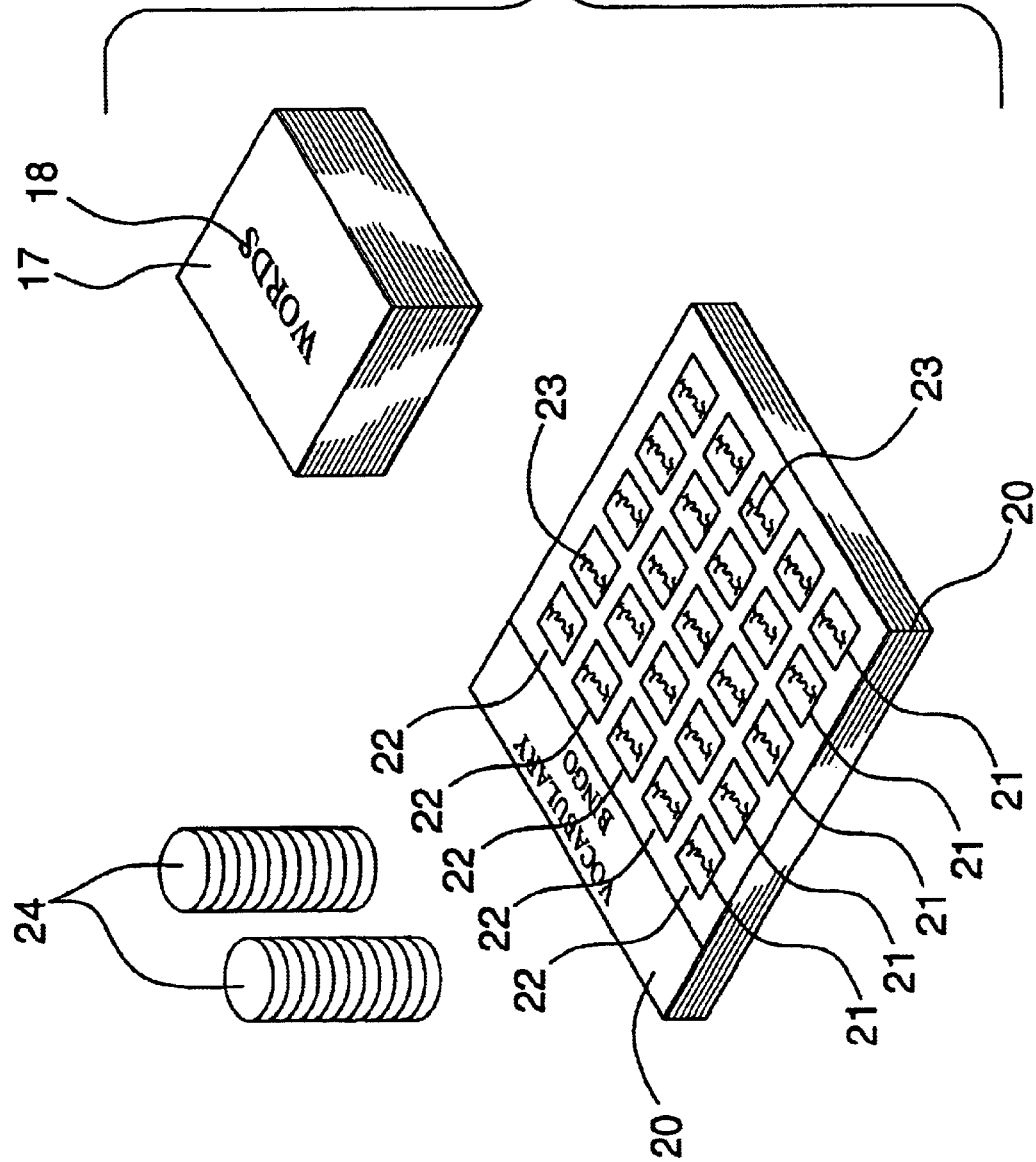
FIG. 2 is a perspective view of the alternate embodiment of the present invention.
Figure 3:
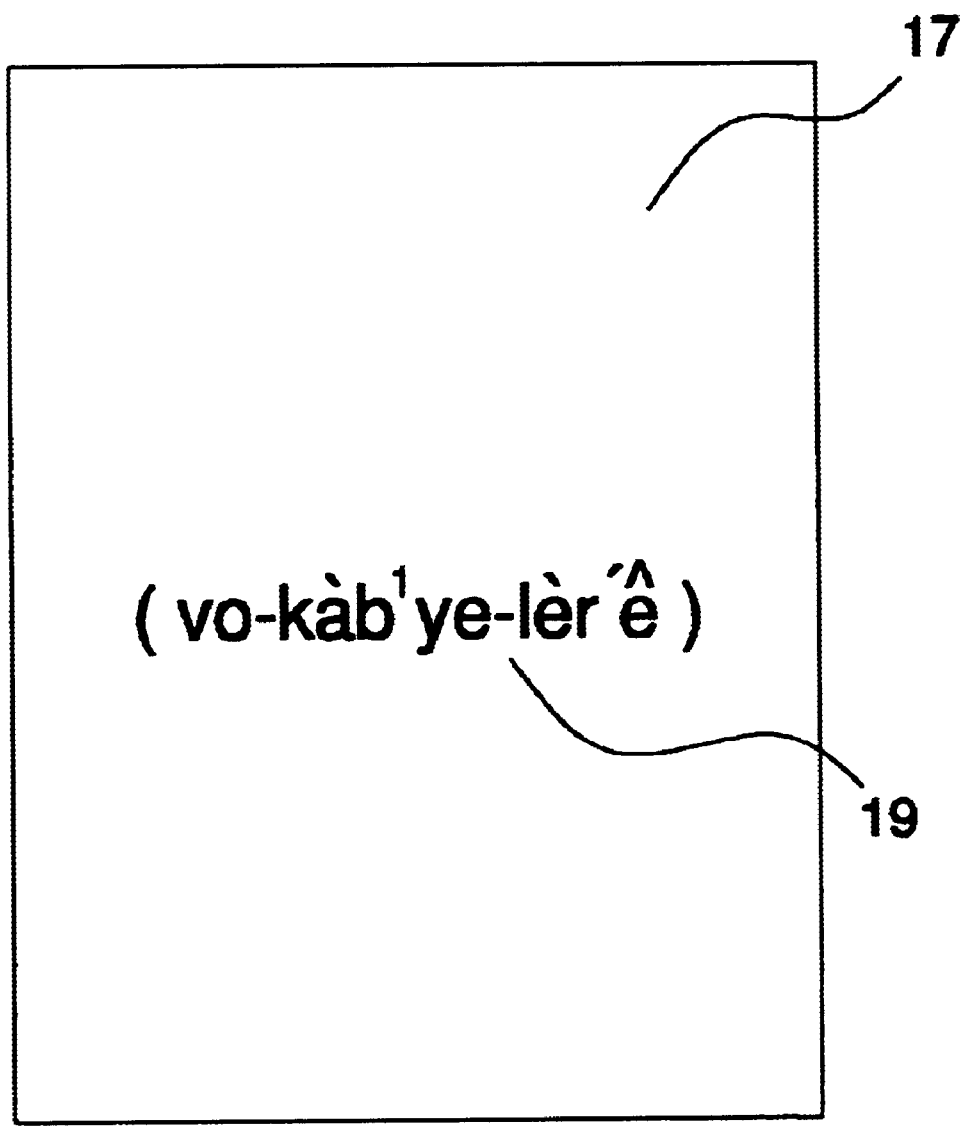
FIG. 3 is a bottom view one of the flashcards of the present invention.

With reference now to the drawings, and in particular to FIGS. 1 through 3 thereof, a new vocabulary teaching system embodying the principles and concepts of the present invention and generally designated by the reference numeral 10 will be described.

As best illustrated in FIGS. 1 through 3, the vocabulary teaching system 10 generally comprises a plurality of subsets 11 each being designed for being used to help teach successive levels of vocabulary to the student. Each of the subsets 11 comprises a plurality of vocabulary sheets 12 and a plurality of worksheets 13. Each of the vocabulary sheets 12 comprises a plurality of vocabulary indicia 14. Each of the vocabulary indicia 14 of each of the vocabulary sheets 12 is designed for representing a unique vocabulary word. Each of the worksheets 13 comprises a plurality of sentence indicia 15. Each of the sentence indicia 15 of each of the worksheets 13 comprises a placeholder 25 for indicating one of the vocabulary indicia 14 of one of the vocabulary sheets 12 whereby the one of the vocabulary indicia 14 indicated by the place holder of the associated one of the sentence indicia 15 is related to the context of the associated one of the sentence indicia 15 to facilitate teaching the use of the vocabulary word represented by the associated one of the vocabulary indicia 14.

Each of the subsets 11 comprises a plurality of folders 16. Each of the folders 16 selectively receives at least one of the worksheets 13 and the associated one vocabulary sheets 12. Each of the folders 16 divides the worksheets 13 and the vocabulary sheets 12 into a plurality of progressive sets whereby the progressive sets are designed for allowing the student to sequentially progress through the associated one of the subsets 11.

At least one of the subsets 11 comprises a plurality of flashcards 17. Each of the flashcards 17 comprises word indicia 18 whereby the word indicia 18 of each of the flashcards 17 matches one of the vocabulary indicia 14 on one of the vocabulary sheets 12 of the associated one of the subsets 11. Each of the word indicia 18 is designed for testing the pronunciation ability of the word indicia 18 of the associated one of the flashcards 17.

Each of the flashcards 17 comprises a pronunciation indicia 19. The pronunciation indicia 19 is positioned on an opposite face of the associated one of the flashcards 17 from the word indicia 18. The pronunciation indicia 19 is designed for providing the pronunciation of the word indicia 18 of the associated one of the flashcards 17.

In an embodiment, as shown in FIG. 2, a plurality of playing cards 20 comprises a plurality of rows 21 and a plurality of columns 22. A number of the rows 21 equaling a number of the columns 22. Each of the rows 21 of each of the playing cards 20 comprises a plurality of random indicia 23. Each of the random indicia 23 comprises one of the word indicia 18 from the flashcards 17. Each of playing cards 20 is designed for allowing the student to match the associated one of the random indicia 23 to the word indicia 18 from one of the flashcards 17 is pronounced, similar to a game of BINGO. Each of a plurality of cover tokens 24 is selectively positionable over one of the random indicia 23 to block out the associated one of the random indicia 23 when the associated one of the random indicia 23 matches the word indicia 18 on one of the flashcards 17 is pronounced.

In use, the user takes the flashcards 17 and uses them help the student to learn the pronunciation of the word indicia 18 on each of the flashcards 17. The pronunciation indicia 19 on the associated one of the flashcards 17 further helps the student to pronounce the word indicia 18 associated with the pronunciation indicia 19. The student then takes one of the vocabulary sheets 12 and the associated one of the worksheets 13 and matches the vocabulary indicia 14 with the sentence indicia 15 associated with the vocabulary indicia 14 to learn the usage of the vocabulary indicia 14. The process is continued through each progressive set and through each of the subsets 11 to provide the student increasing levels of difficulty. To further help the student to learn to pronounce and identify the word indicia 18 of the flashcards 17 each of the playing cards 20 has a random arrangement of random indicia 23 arranged in equivalent rows 21 and columns 22. As each of the word indicia 18 is pronounced the student identifies the matching random indicia 23 and covers the random indicia 23 with one of the cover tokens 24.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vocabulary teaching system for helping a user to teach vocabulary skills to a student, the vocabulary teaching system comprising:

each of a plurality of subsets being adapted for being used to help teach successive levels of vocabulary to the student, each of said subsets comprising a plurality of vocabulary sheets and a plurality of worksheets, each of said vocabulary sheets comprising a plurality of vocabulary indicia, each of said vocabulary indicia of each of said vocabulary sheets being adapted for representing a unique vocabulary word, each of said worksheets comprising a plurality of sentence indicia, each of said sentence indicia of each of said worksheets comprising a placeholder for indicating one of said vocabulary indicia of one of said vocabulary sheets such that the one of said vocabulary indicia indicated by said place holder of the associated one of said sentence indicia is related to the context of the associated one of said sentence indicia to facilitate teaching the use of the vocabulary word represented by the associated one of said vocabulary indicia;

at least one of said subsets comprising a plurality of flashcards, each of said flashcards comprising word indicia such that said word indicia of each of said flashcards matches one of said vocabulary indicia on one of said vocabulary sheets of the associated one of said subsets, each of said word inidicia being adapted for testing the pronunciation ability of said word indicia of the associated one of said flashcards; and a plurality of playing cards comprising a plurality of rows and a plurality of columns, a number of said rows equaling a number of said columns, each of said rows of each of said playing cards comprising a plurality of random indicia, each of said random indicia comprising one of said word indicia from said flashcards, each of playing cards being adapted for allowing the student to match the associated one of said random indicia to said word indicia from one of said flashcards being pronounced.

2. The vocabulary teaching system as set forth in claim 1, further comprising:

each of said subsets comprising a plurality of folders, each of said folders selectively receiving at least one of said worksheets and the associated one vocabulary sheets, each of said folders dividing said worksheets and said vocabulary sheets into a plurality of progressive sets such that said progressive sets are adapted for allowing the student to sequentially progress through the associated one of said subsets.

3. The vocabulary teaching system as set forth in claim 1, further comprising:

each of said flashcards comprising a pronunciation indicia, said pronunciation indicia being positioned on an opposite face of the associated one of said flashcards from said word indicia, said pronunciation indicia being adapted for providing the pronunciation of said word indicia of the associated one of said flashcards.

4. The vocabulary teaching system as set forth in claim 1, further comprising:

each of a plurality of cover tokens being selectively positionable over one of said random indicia to block out the associated one of said random indicia when the associated one of said random indicia matches said word indicia on one of said flashcards being pronounced.

5. A vocabulary teaching system for helping a user to teach vocabulary skills to a student, the vocabulary teaching system comprising:

each of a plurality of subsets being adapted for being used to help teach successive levels of vocabulary to the student, each of said subsets comprising a plurality of vocabulary sheets and a plurality of worksheets, each of said vocabulary sheets comprising a plurality of vocabulary indicia, each of said vocabulary indicia of each of said vocabulary sheets being adapted for representing a unique vocabulary word, each of said worksheets comprising a plurality of sentence indicia, each of said sentence indicia of each of said worksheets comprising a placeholder for indicating one of said vocabulary indicia of one of said vocabulary sheets such that the one of said vocabulary indicia indicated by said place holder of the associated one of said sentence indicia is related to the context of the associated one of said sentence indicia to facilitate teaching the use of the vocabulary word represented by the associated one of said vocabulary indicia;

each of said subsets comprising a plurality of folders, each of said folders selectively receiving at least one of said worksheets and the associated one vocabulary sheets, each of said folders dividing said worksheets and said vocabulary sheets into a plurality of progressive sets such that said progressive sets are adapted for allowing the student to sequentially progress through the associated one of said subsets;

at least one of said subsets comprising a plurality of flashcards, each of said flashcards comprising word indicia such that said word indicia of each of said flashcards matches one of said vocabulary indicia on one of said vocabulary sheets of the associated one of said subsets, each of said word inidicia being adapted for testing the pronunciation ability of said word indicia of the associated one of said flashcards;

each of said flashcards comprising a pronunciation indicia, said pronunciation indicia being positioned on an opposite face of the associated one of said flashcards from said word indicia, said pronunciation indicia being adapted for providing the pronunciation of said word indicia of the associated one of said flashcards; and a plurality of playing cards comprising a plurality of rows and a plurality of columns, a number of said rows equaling a number of said columns, each of said rows of each of said playing cards comprising a plurality of random indicia, each of said random indicia comprising one of said word indicia from said flashcards, each of playing cards being adapted for allowing the student to match the associated one of said random indicia to said word indicia from one of said flashcards being pronounced.

6. The vocabulary teaching system as set forth in claim 5, further comprising:

each of a plurality of cover tokens being selectively positionable over one of said random indicia to block out the associated one of said random indicia when the associated one of said random indicia matches said word indicia on one of said flashcards being pronounced.

* * * * *